(No Model.)  2 Sheets—Sheet 1.

C. BRÜTSCH.
MACHINE FOR ORNAMENTING PICTURE FRAME MOLDINGS.

No. 328,835.  Patented Oct. 20, 1885.

WITNESSES:
A. Schehl.
Ernst Wolff.

INVENTOR
Carl Brütsch
BY Goepel & Raegener
ATTORNEYS.

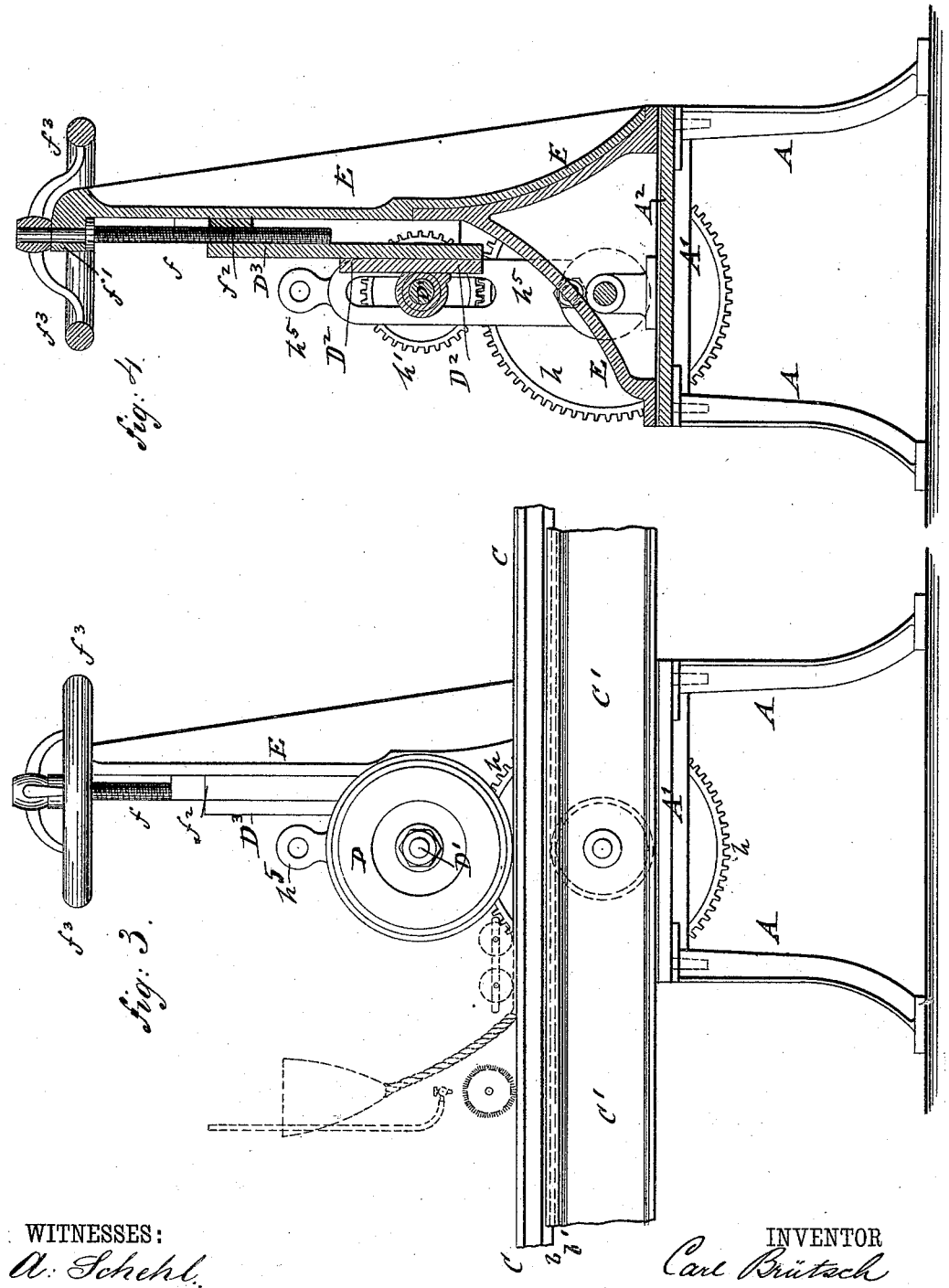

UNITED STATES PATENT OFFICE.

CARL BRÜTSCH, OF NEW YORK, N. Y.

MACHINE FOR ORNAMENTING PICTURE-FRAME MOLDINGS.

SPECIFICATION forming part of Letters Patent No. 328,835, dated October 20, 1885.

Application filed February 28, 1885. Serial No. 157,304. (No model.)

*To all whom it may concern:*

Be it known that I, CARL BRÜTSCH, of the city, county, and State of New York, have invented certain new and useful Improvements in Machines for Ornamenting Picture-Frame Moldings, of which the following is a specification.

This invention has reference to an improved machine for ornamenting picture-frame moldings with plastic material in a quick and uniform manner; and the invention consists of a machine for ornamenting picture-frame moldings, consisting of a longitudinally-movable slide-plate supporting the molding to be ornamented, a rotary molding-roller the shaft of which turns in bearings of a pivoted plate which is supported by a vertically-adjustable slide-plate and a vertical standard. Rotary motion is imparted to the molding-roller from the main shaft by transmitting gear-wheels, an auxiliary shaft having a splined extension-sleeve and connecting the shaft of the upper gear-wheel with the extension-sleeve and the auxiliary shaft with the roller-shaft, as will more fully appear hereinafter, and finally be pointed out in the claims.

Figure 1:
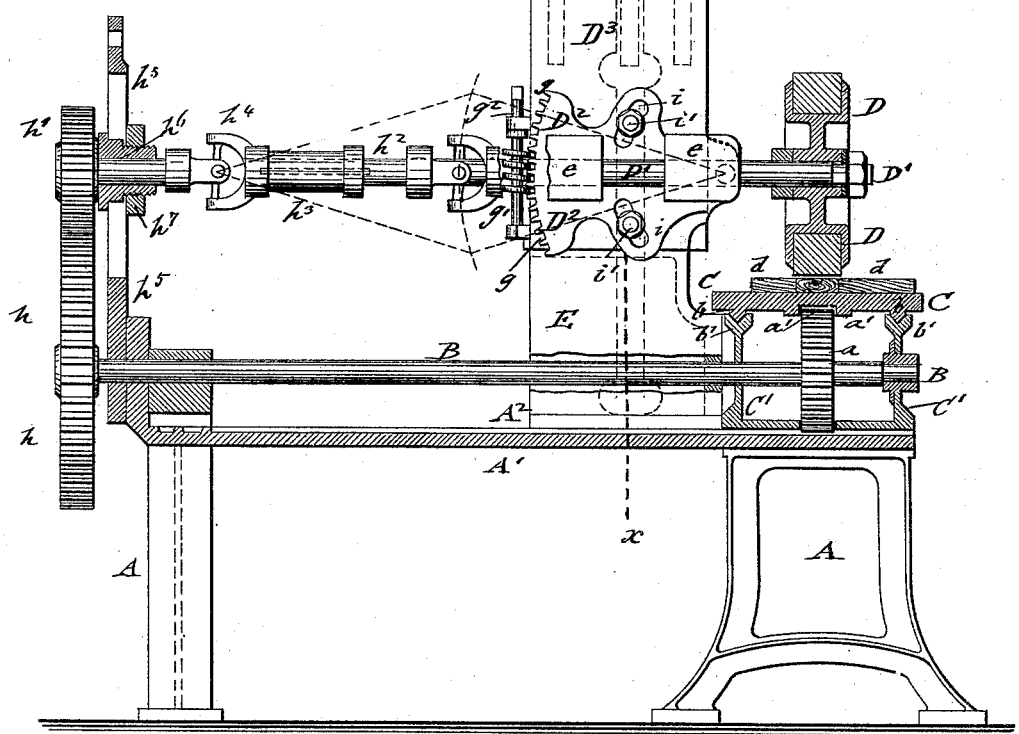
Figure 2:
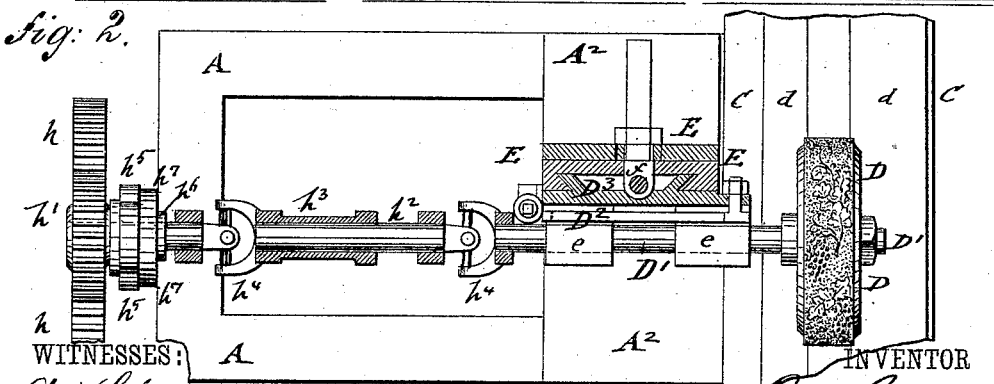

In the accompanying drawings, Figure 1 represents a vertical transverse section of my improved machine for ornamenting picture-frame moldings. Fig. 2 is a vertical horizontal section of the same; Fig. 3, a side elevation, and Fig. 4 a vertical transverse section on line *x x*, Fig. 1.

Similar letters of reference indicate corresponding parts.

Referring to the drawings, A represents the supporting-standards of my improved machine for ornamenting picture-frame moldings. The standards A A are transversely connected by a horizontal frame, A', and provided with bearings for a driving-shaft, B, to which is keyed, near one end, a gear-wheel, $a$, that meshes with a rack, $a'$, at the under side of a slide-plate, C, that moves by guide-rails $b$ in ways $b'$ of longitudinal pieces C'. On the slide-plate C is supported, by suitable retaining-pieces, $d\ d$, the molding which is to be ornamented with plastic material. The plastic material is fed from a suitable tank or reservoir to the face of the molding, which has first been coated with liquid glue by means of a rotating brush, as shown in dotted lines in Fig. 3; or the surface of the molding may first be coated with glue, which glue is moistened by warm water applied by the brush, so that the surface is thereby prepared to receive the plastic material. The plastic material is spread uniformly over the surface of the molding to be ornamented by means of rollers, which turn in a common frame, as shown in dotted lines in Fig. 3.

The means shown for moistening the surface of the molding and for supporting and spreading a layer of plastic material have been used heretofore, and do not form a part of this invention.

From the spreading-rollers the layer of plastic material passes forward with the movable slide-plate C and below a molding-roller, D, which is made of metal and engraved at the circumference of its rim according to the design that is to be produced on the molding.

The molding-roller D is attached to a shaft, D', which turns in bearings $e\ e$ of a plate, $D^2$, that is pivoted to a vertical slide-plate, $D^3$, which is guided in ways of a vertical standard, E, supported on a bed-plate, $A^2$, of the horizontal frame A'. The slide-plate $D^3$ is adjusted by a screw-spindle, $f$, that turns in bearings $f'$ of the standard E, and engages a nut, $f^2$, at the upper part of the slide-plate $D^3$. The screw-spindle $f$ is provided with a hand-wheel, $f^3$, for conveniently turning the spindle. The pivoted bearing-plate $D^2$ for the shaft D' is provided with arc-shaped slots $i$ concentric to the pivot of the plate, which slots serve to guide the plate $D^2$ when it is adjusted higher or lower on the slide-plate $D^3$. The rear end of the bearing-plate $D^2$ is made in the shape of a toothed segment, $g$, as shown in Fig. 1, which segment is engaged by a worm, $g'$, the shaft $g^2$ of which turns in bearings of the slide-plate. By turning the worm $g$ the bearing-plate is moved on its pivot in one or the other direction, and thereby the shaft D supported in inclined position, according to the inclination imparted to the molding-roller. The inclination of the molding-roller has to correspond to the inclination of the face of the molding. The molding-roller D has first to be adjusted to the thickness of the molding by means of the vertical slide-plate $D^3$ and the screw-spindle $f$, and then to the inclined face of the molding by the pivoted bearing-plate $D^2$, segment $g$, and worm $g'$, after which the plate $D^2$ is clamped to the slide-plate $D^3$ by screw-nuts $i'$, Fig. 1.

Rotary motion is imparted to the molding-wheel D by a gear-wheel transmission, $h$ $h'$, at the ends of the main shaft B and shaft $D'$, and by an auxiliary shaft, $h^2$, having a splined extension-sleeve, $h^3$, so as to slide longitudinally thereon. The shaft $h^2$ and sleeve $h^3$ are connected by universal joints $h^4$, respectively, with the shaft of the gear-wheel $h'$ and the shaft $D'$ of the molding-roller D. By means of the auxiliary shaft $h^2$, extension-sleeve $h^3$, and universal joints $h^4$ rotary motion is transmitted to the shaft of the molding-roller D, whether said shaft is in a horizontal position or supported at an angle of inclination to the same, as indicated in dotted lines in Fig. 1. The shaft of the gear-wheel $h'$ is supported in a sleeve-shaped bearing, $h^6$, of a slotted standard, $h^5$, to which the bearing is clamped by a screw-nut, $h^7$, turning on the threaded end of said bearing, as shown in Fig. 1.

The molding-roller has to move at the same speed as the supporting slide-plate of the molding, so that the layer of plastic material may be properly ornamented in relief by the molding-wheel. The moldings to be ornamented are passed successively below the molding-roller after their faces have been supplied with plastic material, and thereby the proper design is produced in a quick, uniform, and reliable manner on the same. The plastic material is then allowed to dry, after which the usual bronze or gilt coating is applied to it in the usual manner.

Having thus described my invention, I claim as new and desire to secure by Letters Patent—

1. The combination of a horizontally-movable slide-plate, supporting the molding, with a rotating molding-roller having an engraved rim, substantially as set forth.

2. The combination of a horizontally-movable slide-plate supporting the molding to be ornamented, a molding-roller, mechanism for transmitting rotary motion to said roller, and mechanism by which the molding-roller is adjusted to the face of the molding, substantially as set forth.

3. The combination of a horizontally-movable slide-plate supporting the molding to be ornamented, a molding-roller having an engraved rim, mechanism for transmitting rotary motion to the roller, a pivoted plate having bearings for the shaft of the molding-roller, a vertically-adjustable slide-plate, and a vertical standard for supporting said slide-plate, substantially as set forth.

4. The combination of a supporting-frame having vertical guide-pieces, a horizontally-movable slide-plate supporting the molding to be ornamented, a molding-roller having an enlarged rim, mechanism for transmitting rotary motion to the roller, a pivoted plate having bearings for the shaft of the molding-roller, a worm-gear for adjusting the bearing-plate, a vertical slide-plate supporting the pivoted plate, a screw-spindle for adjusting the slide-plate, and a vertical standard for guiding the slide-plate, substantially as described.

5. The combination of a molding-roller, a shaft attached to the molding-roller, a pivoted plate having bearings for the roller-shaft, a worm-gear for adjusting said plate, a vertically-adjustable slide-plate supporting the bearing-plate, transmitting gear-wheels, a main shaft, an auxiliary shaft having a splined extension-sleeve, and universal joints connecting the extension-sleeve and auxiliary shaft, respectively, with the shaft of one of the upper gear-wheels and the roller-shaft, whereby rotary motion is transmitted to the roller-shaft, whether the same is supported in horizontal or inclined position, substantially as specified.

In testimony that I claim the foregoing as my invention I have signed my name in presence of two subscribing witnesses.

CARL BRÜTSCH.

Witnesses:
  PAUL GOEPEL,
  CARL KARP.